United States Patent Office 3,268,504
Patented August 23, 1966

3,268,504
AROMATIC SULFIDES
Guy H. Harris, Concord, and Bryant C. Fischback, Walnut Creek, Calif., assignors to The Dow Chemical Company, Midland, Mich., a corporation of Delaware
No Drawing. Filed Dec. 12, 1960, Ser. No. 75,102
6 Claims. (Cl. 260—125)

The present invention relates to an improved process for the production of aromatic sulfides and to new compositions of matter prepared by the improved process. The new aromatic sulfide condensation products have higher molecular weights than the aromatic sulfide condensates heretofore obtained by the previously known methods.

Aromatic sulfides have been made by reacting a nuclearly-substituted aromatic chloride with a sulfide of a metal from the group consisting of the alkali and alkaline earth metals in the presence of sulfur at a temperature of 275° to 360° C. according to U.S. Patents Nos. 2,538,-941 and 2,513,188. The production of the polyaryl sulfide resins by the method there described is amenable to small-scale work but it has been found that difficulties arise in large volume scale-up reproduction of the techniques. One of the more pronounced difficulties is the degradation of the desired product prior to recovery from the reaction medium.

It is an object of this invention to provide a process for producing aromatic sulfides (polyaryl sulfides) which process eliminates the technical difficulties encountered in procedures heretofore employed and results in more economical practices. Another object of this invention is to provide a new class of aromatic sulfide condensation products of wide commercial utility including resins comprising aromatic sulfides. These and other objects and advantages will be apparent from the following detailed description thereof.

It has now been found that polyaryl sulfide polymers of higher molecular weight than heretofore thought possible can be prepared in high yields by employing one of the following novel processes:

(1) Fusing a nuclearly halogenated aromatic compound having at least two of the halogen atoms selected from the group consisting of bromine and chlorine and having at least two of said halogens in position other than ortho one to another, with sulfur and a carbonate, oxide or borate of an alkali or alkaline earth metal in the presence of an initiator such as a poly (nuclearly halogenated aromatic) sulfide or sulfonium halide compound having at least two of said halogens having an atomic number from 17 to 35, inclusive, at a temperature of from about 225° C. to about 265° C. under at least the autogenous pressure and in the absence of oxygen. It is to be understood that the first mentioned nuclearly halogenated aromatic compound and the initiator can be one and the same, it being possible in accordance with the teachings herein set forth to prepare dimers and trimers and subsequently to polymerize these materials to prepare high molecular weight materials as well as to employ the monomer halides and sulfur to prepare directly the high molecular weight polymers when such latter reaction is carried out in the manner and in the presence of an initiator of the class here taught.

(2) Fusing a nuclearly halogenated aromatic compound having at least two halogen atoms selected from the group consisting of bromine and chlorine and having at least two of the halogen atoms in position other than ortho one to the other with "livers of sulfur" in the absence of oxygen and under superatmospheric pressure and preferably under autogenous pressure. As in the first described method the nuclearly halogenated aromatic compound can be a poly(nuclearly halogenated aromatic) sulfide or sulfonium halide compound, the halogens having an atomic number of from 17 to 35, inclusive. The term "livers of sulfur" as herein employed refers to the product obtained by reacting sulfur with a carbonate, oxide or borate of an alkali or alkaline earth metal at a temperature of from about 275° to 365° C. in the absence of oxygen and under superatmospheric pressure.

(3) Fusing a poly(nuclearly halogenated aromatic) sulfide or sulfonium halide at least two of said halogens having an atomic number of from 17 to 35, inclusive, or a low molecular weight (e.g. dimer) product of the processes described under 1 and 2 above, with sulfur and a sulfide of a metal selected from the group consisting of alkali and alkaline earth metals at a temperature of from 225° to 265° C. under superatmospheric pressure and in the absence of oxygen.

Substantially any nuclearly poly halogenated aromatic compound which contains at least two halogen atoms having an atomic number of from 17 to 35, inclusive, attached to the aromatic carbon in a position other than ortho one to the other, and which compound can contain other substituents which are unreactive under the conditions of reaction, can be employed as the starting aromatic reactant. Bearing in mind that at least two halogens must be other than ortho one to another, representative classes of poly(nuclearly halogenated) aromatic compounds which can be employed in accordance with the present invention are the halobenzenes, the haloxylenes, the halotoluenes, the halotrimethylbenzenes, the halonaphthalenes, the halomethylnaphthalenes, the haloanthracenes, the halomethylanthracenes, the halophenanthrenes, the halomethylphenanthrenes, the halodiphenyls, the alkylene bishalophenyls, the di (halophenyl) sulfides, the poly (halophenyl) sulfides, the tri (halophenyl) sulfonium halides and the like wherein each of such compounds contains at least two halogens having an atomic number from 17 to 35 inclusive, and when only two of such halogens are present that they are in positions other than ortho one to the other.

Thus polyhaloaromatic compounds which can be employed are those represented by one of the general formulae:

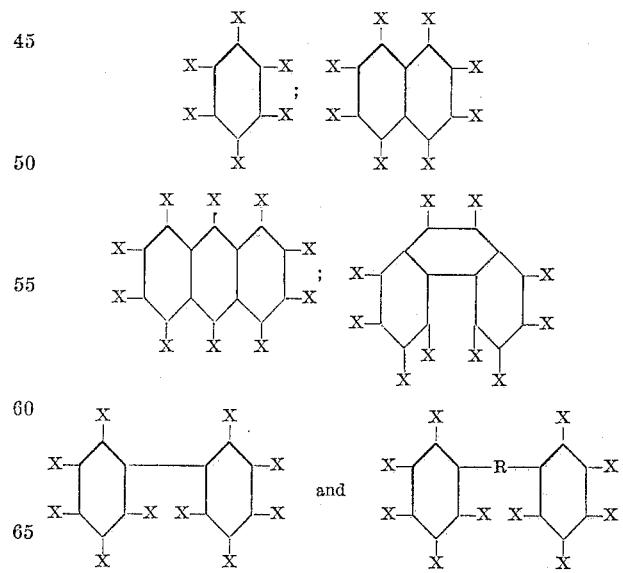

wherein each X represents an independently selected radical of chlorine, bromine, iodine, fluorine, lower alkyl having from 1 to 4 carbon atoms, inclusive, and at least two of the X's are halogens selected from the group consisting of bromine and chlorine and at least two of the halogens are in positions other than ortho one to the other; and R represents a bivalent hydrocarbon radical having from 1 to 6 carbon atoms. Thus, one can employ m-, or p-chloro-, dibromo-, or chlorobromo-benzene; 1,2,3-, 1,3,5-, 1,2,4-, 1,2,5-, trichloro or tribromobenzene; 1-bromo-3,5-dichlorobenzene, 1-bromo-2,5-dichlorobenzene, 1-chloro-2,5-dibromobenzene; 1,2,4,5-, 1,2,3,4-, 1,2,4,6-tetrachloro- or tetrabromobenzene, pentachloro- or pentabromobenzene, hexabromo- or hexachlorobenzene and the like. Similarly the toluenes and xylenes having at least two nuclear substituted halogen atoms, having an atomic number from 17 to 35 inclusive, and where at least two halogens are present in a position other than ortho one to the other can be employed in accordance with the present teachings.

The bis and poly(haloaryl) sulfides and sulfonium compounds which can be employed as initiators and/or reactants are those having the general formulae

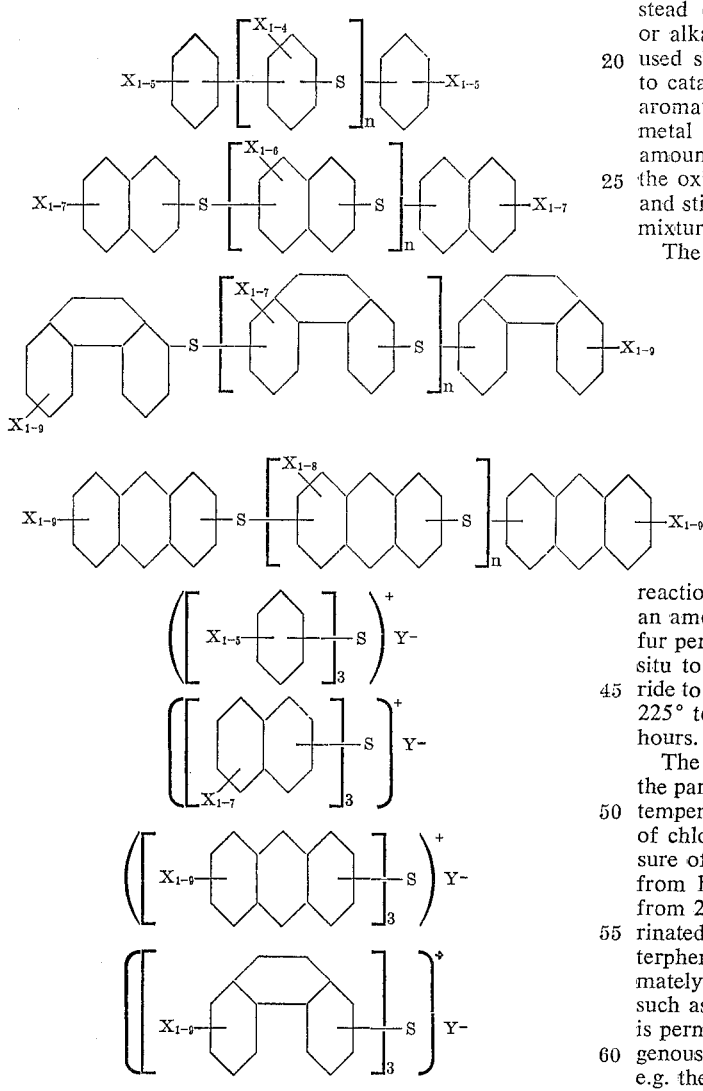

wherein X represents halogen or lower alkyl and at least one X on each aromatic nucleus being a halogen of which at least one of such halogens has an atomic number from 17 to 35, inclusive, $n$ represents an integer from 0 to about 10 or more and Y represents an anion.

The preferred alkali or alkaline earth metals which are employed in the various procedures above set forth are sodium, potassium, magnesium, calcium, barium, and lithium. Although other members of these groups of metals can be employed the aforenamed are preferred because of their ready availability. In this light compounds of sodium are particularly desirable because in addition to being readily available they are the least expensive of this group of metals. As above indicated, the alkali or alkaline earth metal can be added as the oxide, carbonate, borate or sulfide. In the latter instance, i.e., the sulfide, it is understood that it need not be added as such to the reaction mixture but may be formed in situ by the reaction of oxide, carbonate, or borate of an alkali or alkaline earth metal with sulfur. When the sulfide is formed in situ we have found the reaction to form the desired aromatic sulfide takes place more readily and hence it is preferred to follow the procedure of producing the sulfide in situ. Alternatively, the sulfide may be formed in the reaction mixture by the decomposition of an alkali or alkaline earth metal polysulfide.

When monosulfide linkages are desired in the polymers, the reaction mixture should consist of the nuclearly halogenated aromatic compound, sulfur, an initiator and an alkali or alkaline earth metal monosulfide, or an alkali or alkaline earth metal oxide, carbonate or borate instead of the monosulfide. When employing the alkali or alkaline earth metal monosulfide, the amount of free sulfur used should be relatively small, i.e., only that sufficient to catalyze the reaction between the monosulfide and the aromatic chloride. When using an alkali or alkaline earth metal oxide, carbonate or borate, a substantially larger amount of free sulfur is used, i.e., sufficient to react with the oxide, carbonate or borate to from the sulfide in situ and still leave a small excess of free sulfur in the reaction mixture which can act as a catalyst or the like.

The amount of sulfur employed as a catalyst in the reactions above described is preferably such as to supply an amount of from about 0.01 to 0.25 atoms of free sulfur per molecule of metal sulfide introduced or formed in situ to insure complete conversion of the aromatic chloride to the aromatic sulfide at a temperature of from about 225° to about 265° C. in a period of from about 20 to 30 hours.

The reaction is carried out at a pressure equivalent to the partial pressure of the aromatic chloride at the reaction temperature i.e., autogenous pressures. Thus, in the case of chlorobenzene, the reaction may be carried at a pressure of from 10 to 50 atmospheres the pressure resulting from heating the reaction mixture to a temperature of from 225° to 265° C. When reacting high boiling chlorinated aromatics such as for example, dichlorinated m-terphenyl, the reaction may be carried out at approximately atmospheric pressure under an inert atmosphere such as nitrogen or carbon dioxide. In general, pressure is permited to build up in the reaction vessel to the autogenous pressure of the mixture as the composition changes, e.g. the carbon dioxide generated when an alkali or alkaline earth carbonate is employed as a constituent of the reaction mixture will assist in creating a higher pressure than when the sulfides are introduced as reactants.

The resins derived in accordance with the present invention from p-dichlorobenzene, m-dichlorobenzene, mixtures of such chlorinated benzenes, other dichlorinated aromatic compounds including diphenyl, diphenyl ether, terphenyl and naphthalene derivatives, are practically insoluble in sodium sulfide solutions, exhibit no dyeing properties, have high molecular weights (in some cases estimated, from their physical properties, at 35,000 to 300,000), and have tensile and flexural strengths of the order of 13,000 to 15,000 pounds per square inch in the unplasticized state. The resins are somewhat colored, cream to brown in the powdered state, have a high thermal stability, and are of high chemical stability except toward strong oxidizing agents, such as nitric acid. After fusing or pressing they take on the character of glasses, but with rise in temperature they become resilient and finally pass into a plastic state. When plasticized with sulfur the phenylene disulfide and polysulfide resins are mostly rubber-like in properties and readily dissolve on heating with organic disulfides, such as phenyl disulfide or tetramethylthiuram disulfide. They are otherwise sparingly soluble in organic solvents.

Resins produced from reaction mixtures including aromatic monochloride along with the dichloride, on the other hand are relatively low melting, of low viscosity and molecular weight and are soluble in organic solvents.

Resins produced from 1,2,4-trichlorobenzene, 1,2,4,5-tetrachlorobenzene or hexachlorobenzene are insoluble, yellow to green pigments, having no dyeing effects and which do not fuse at temperatures up to 450° C.

More specifically phenylene monosulfide resins having an empirical formula $(C_6H_4S_x)_m$ for the repeating unit where $x$ is a number from 1 to 1.25, have a sulfur content of from 30 percent to 34 percent and are conveniently made by reacting m- or p-dibromo- or dichlorobenzene, or bis (m- or p-chlorophenyl) sulfide, or tris (m- or p-chlorophenyl) sulfonium halide, sulfur and a metal sulfide, preferably produced in situ by the reaction of a metal carbonate and sulfur, the reaction mixture suitably consisting of 3.3 parts by weight of the dichloro compound, 6.0 to 7.0 parts of sodium carbonate, 1.1 to 1.8 parts of sulfur and .15 to 1.5 parts of bis (m- or p-chlorophenyl) sulfide, tris (m- or p-chlorophenyl) sulfonium halide or similar initiator and being fused for about 24 hours at 250° C. under pressure. The resultant novel resins have a chlorine content of about less than 0.1 percent and a molecular weight of from 35,000 to 300,000; are insoluble in sulfur at about 132° C.; are practically insoluble in acids such as hydrochloric and sulfuric acids; dissolve with decomposition in hot strongly oxidizing acids, such as nitric or chrome sulfuric acid; are practically insoluble in organic solvents; are thermally stable at temperatures up to and above 300° C.; show practically no water absorption; have good surface hardness, about the same as polystyrene resins; have brittle points of from 10° to below −60° C.; soften at 100° to 120° C.; are resilient from the softening points up to from 215° C. to 240° C.; become transparent at 255° to 270° C.; and are plastic in form from 260° to about 500° C.

Phenylene di- and polysulfide resins the repeating units of which have an empirical formula corresponding to $(C_6H_4S_x)_m$ where $x$ is a number from 2 to 5 have a sulfur content of from 48 percent to 68 percent by weight and are conveniently made by reacting a di- or polyhaloaromatic compound such as p-dichlorobenzene, or a bis (halophenyl) sulfide or tris (halophenyl) sulfonium halide, sulfur and a metal sulfide, the latter preferably produced in situ by reacting a metal carbonate and sulfur, the reaction mixture suitably consisting of 3.3 parts by weight of di- or polyhalo aromatic compound, 3.9 parts of sodium carbonate and 2.35 to 4.5 parts of sulfur and .15 to 1.5 parts of initiator and being fused for about 20 hours at 250° C. under pressure. The resulting resins have a chlorine content of about .4 percent and a molecular weight of from 10,000 to 300,000; are soluble in sulfur at 132° C.; have a relative viscosity of more than 20; are practically insoluble in acids, such as hydrochloric and sulfuric acids; dissolve with decomposition in hot strongly oxidizing acids, such as nitric acid or chrome sulfuric acid; are practically insoluble in alkalis; are insoluble or sparingly soluble in most organic solvents; soluble in organic disulfides; thermally stable at temperatures above 300° C.; show practically no water absorption; have a high surface hardness; vary in brittle points from 50° C. to 70° C. and in softening points from 55° to 80° C., depending on composition; are resilient from the softening points up to from 165° to 180° C.; are plastic from 140° to 340° C. and fuse above 340° C.

The simple diaryl sulfides and polyaryl sulfides may be used as plasticizers, insecticides, fungicides, as addition agents for lubricating oils and as ore flotation agents. The aromatic sulfide and polysulfide resins are usable as surfacing and sealing compounds, pigments, rubber compounding materials, rubber substitutes, and as molding powders of high thermal and chemical stability, having useful properties over a very wide temperature range. They are odorless and tasteless in a refined state. They are of particular commercial interest because of their relatively low potential material cost, the basic raw materials, such as benzene, chlorine, lime, or soda ash and sulfur being among the cheapest available raw materials.

The following examples are illustrative of the present invention but are not to be construed as limiting:

EXAMPLE I

Anhydrous sodium carbonate (84.9 grams; 0.801 mole), sublimed sulfur (15.1 grams; 0.471 mole), p-dichlorobenzene (44.1 grams; 0.30 mole), and tri-(p-chlorophenyl) sulfonium chloride (12.0 grams; 0.030 mole) were ground in a mortar and blended together. The solid mixture was placed in a glass bomb liner and heated in a steel bomb to 250°±5° C. under nitrogen for 24 hours. No rocking, shaking, or rolling was used. The contents of the bomb were cooled and then removed and extracted with boiling water. The residue was then placed in a Soxhlet extractor and extracted with boiling toluene for 8 hours. The residue was taken up in boiling diphenyl oxide, filtered, and the filtrate allowed to cool. The product was precipitated as a pale cream colored solid melting at 220° C. and having a molecular weight of 9600 by chlorine end-group analysis. Yield was 60 percent of the theoretical based on total chlorinated starting materials.

*Analysis.*—Chlorine, 0.74 percent. Sulfur, 37.86 percent.

EXAMPLE II

A. Preparation of "livers of sulfur"

Sodium carbonate (84.9 grams, 0.801 mole) and sublimed sulfur (15.1 grams, 0.471 mole) were ground and blended in a mortar. The mixture was heated to 325° C. for 24 hours in a glass liner contained in a stainless steel bomb under nitrogen. No rocking, shaking, or rolling was used. The resulting product was cooled, removed from the bomb with careful exclusion of air, and pulverized under nitrogen.

B. Reaction with p-dichlorobenzene

The "livers of sulfur" was intimately mixed with finely divided p-dichlorobenzene (44.1 grams, 0.30 mole) and heated to 250° C. under nitrogen for 24 hours in a glass liner contained in a steel bomb. The bomb was held stationary during the heating period. The contents of the bomb were cooled and removed and finely ground. The solid was extracted with boiling water and then extracted with boiling toluene in a Soxhlet system. The residue was recrystallized from diphenyl oxide to yield a pale yellow solid melting at 220° C. Yield was 58.6 percent. Molecular weight was approximately 5100.

*Analysis.*—Chlorine, 1.38 percent. Sulfur, 34.48 percent.

EXAMPLE III

Anhydrous sodium carbonate (120 grams, 1.132 moles), sulfur (26.4 g., 0.824 mole), p-dichlorobenzene (26.5 g., 0.18 mole), 1,2,4-trichlorobenzene (9.07 g., 0.05 mole), and bis (4-chlorophenyl) sulfide (5.1 g., 0.02 mole) were ground and intimately mixed and placed in a glass liner contained in a stainless steel bomb. The contents were heated to 250° C. under nitrogen for 24 hours. The contents were then cooled and the solid was finely ground, extracted with boiling water, and then extracted with boiling toluene in a Soxhlet system. The residue weighed 24.1 grams, which represents an 80.3 percent yield. Molecular weight was approximately 14,400.

*Analysis.*—Chlorine, 0.498 percent. Sulfur, 47.88 percent.

EXAMPLE IV

Bis (p-chlorophenyl) sulfide (63.8 g., 0.250 mole), sulfur (26.4 g., 0.824 mole), and sodium carbonate (120 g., 1.132 moles) were ground, mixed, and charged to a glass-lined autoclave under nitrogen, and the mixture was heated to 250° C. for 24 hours. The contents were removed, extracted with boiling water, and dried. The solid was extracted 8 hours with toluene in a Soxhlet system. The insoluble portion was dried. It could be molded at 175° C. to give a flexible film. Yield was 65.5 percent. Apparent molecular weight (by chlorine end-group analysis) was in excess of 237,000.

*Analysis.*—Chlorine, <0.03 percent. Sulfur, 32.96 percent.

EXAMPLE V

A run patterned after Example IV was run in which the sulfur and sodium carbonate were fused at 350° C. for 24 hours under nitrogen and then added to bis (4-chlorophenyl) sulfide under nitrogen and heated to 254° C. for 24 hours. This product was worked up exactly like that of Example IV. Yield of toluene-insoluble resin was 51.4 percent. Apparent molecular weight was 222,000.

*Analysis.*—Chlorine, 0.032 percent. Sulfur, 39.92 percent.

EXAMPLE VI

Bis (p-chlorophenyl) sulfide (51.03 g., 0.20 mole), 1,2,4-trichlorobenzene (9.07 g., 0.05 mole), sulfur (26.4 g., 0.824 mole), and sodium carbonate (120 g., 1.132 moles) were ground, mixed, and heated under nitrogen at 253° C. for 24 hours. The resulting product was worked up in the exact manner of Example IV to yield 57.4 percent of a toluene-insoluble resin having an apparent molecular weight of 66,700. The resin could be molded to a transparent, hard film at 180° C.

*Analysis.*—Chlorine, 0.106 percent. Sulfur, 46.70 percent.

EXAMPLE VII

Bis (4-chlorophenyl) sulfide (383 g., 1.5 moles), sodium carbonate (720 g., 36.8 moles), and sulfur (158.4 g., 4.95 moles) were ground and blended together and heated to 249±3° C. for 24 hours under nitrogen. The pressure reached 425 p.s.i. Upon cooling the contents were removed, washed well with water and then extracted with toluene in a Soxhlet system. Yield of insoluble polymer was 72.0 percent. Apparent molecular weight was 230,000.

*Analysis.*—Chlorine, 0.03 percent. Sulfur, 44.59 percent.

We claim:

1. A process for producing a polyaromatic sulfide which comprises fusing at a temperature of 225° to 265° C. a reaction mixture consisting essentially of (A) a nuclearly polyhalogenated aromatic hydrocarbon compound having not more than three aromatic rings and containing at least two nuclearly substituted halogen atoms having an atomic number of from 17 to 35, inclusive which are not ortho one to the other, (B) a compound the cation of which is a metal selected from the group consisting of alkali and alkaline earth metals and the anion of which is selected from the group consisting of oxide, borate and carbonate and (C) sulfur, under autogenous pressure and in the presence of an initiator selected from the group consisting of bis (haloaryl) sulfides, and tris (haloaryl) sulfonium chlorides, wherein at least two of the halogens have an atomic number from 17 to 35, inclusive.

2. A process for producing a polymeric sulfide of an aromatic compound having not more than three aromatic rings which comprises fusing at 225° to 265° C. a reaction mixture consisting essentially of (A) a nuclearly halogenated aromatic hydrocarbon compound containing at least two nuclearly substituted halogen atoms having an atomic number from 17 to 35 inclusive in a position other than ortho one to the other with a (B) product of the reaction, at a tempertaure of from 275–365° C. of sulfur and a compound the anion of which is selected from the group consisting of carbonate, borate and oxide and the cation is a metal selected from the group consisting of alkali and alkaline earth metals; said fusion of (A) with (B) being carried out in the absence of oxygen under superatmospheric pressure.

3. A process for preparing polysulfides which comprises reacting a poly (chlorophenyl) sulfide with sulfur and an alkali compound the cation of which is selected from the group consisting of the alkali and alkaline earth metals and the anion of which is selected from the group consisting of oxide, borate and carbonate at a temperature of from 225° to about 265° C. in the absence of oxygen and under superatmospheric pressure.

4. The process as set forth in claim 1 wherein the sulfur and alkali compound are pre-reacted at 275° to 375° C. in the absence of oxygen to form "livers of sulfur."

5. The process of claim 3 wherein the sulfur and alkali compound are pre-reacted to form a sulfide of the alkali in excess sulfur.

6. A process for producing a polyaromatic sulfide which comprises fusing at from 225° to 265° C. a reaction mixture consisting essentially of (A) a nuclearly polyhalogenated aromatic hydrocarbon compound having not more than three aromatic rings and containing at least two nuclearly substituted halogen atoms having an atomic number of from 17 to 35, inclusive which if only two such atoms are present are not ortho one to the other, (B) a compound the cation of which is a metal selected from the group consisting of alkali and alkaline earth metals and the anion of which is selected from the group consisting of oxide, borate and carbonates; and (C) sulfur, and under autogenous pressure and in the presence of an initiator selected from the group consisting of poly (haloaryl) sulfides and poly (haloaryl) sulfonium chlorides and wherein at least two of the halogens have an atomic number of from 17 to 35, inclusive.

References Cited by the Examiner

UNITED STATES PATENTS 2,538,941 1/1951 Macallum _____ 260—79

CHARLES B. PARKER, *Primary Examiner.*

H. N. BURSTEIN, DANIEL D. HORWITZ, *Examiners.*